(12) United States Patent
Shaham

(10) Patent No.: US 11,387,931 B2
(45) Date of Patent: Jul. 12, 2022

(54) JAMMING WI-FI COMMUNICATIONS

(71) Applicant: Wintego Systems Ltd., Yokneam Ilit (IL)

(72) Inventor: Eliezer Shaham, Yokneam Ilit (IL)

(73) Assignee: Wintego Systems Ltd., Yokneam Illit (IL)

( * ) Notice: Subject to any disclaimer, the term of this patent is extended or adjusted under 35 U.S.C. 154(b) by 0 days.

(21) Appl. No.: 16/924,242

(22) Filed: Jul. 9, 2020

(65) Prior Publication Data

US 2021/0013986 A1 Jan. 14, 2021

(30) Foreign Application Priority Data

Jul. 11, 2019 (IL) .......................................... 268022

(51) Int. Cl.
*H04K 3/00* (2006.01)
*H04B 7/06* (2006.01)
*H04B 17/318* (2015.01)
*H04W 84/12* (2009.01)

(52) U.S. Cl.
CPC .............. *H04K 3/42* (2013.01); *H04B 7/0617* (2013.01); *H04B 17/318* (2015.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 2007/0025313 A1* | 2/2007 | Bhagwat | H04L 29/12367 370/338 |
| 2008/0002651 A1 | 1/2008 | Nakano | |
| 2008/0119130 A1 | 5/2008 | Sinha | |
| 2010/0166180 A1* | 7/2010 | Steer | H04K 3/825 380/252 |
| 2016/0330788 A1* | 11/2016 | Zheng | H04W 76/27 |

FOREIGN PATENT DOCUMENTS

WO WO 2021/005605 1/2021

OTHER PUBLICATIONS

International Search Report and the Written Opinion dated Oct. 15, 2020 From the International Searching Authority Re. Application No. PCT/IL2020/050770. (12 Pages).
Amuru et al. "Optimal Jamming Against Digital Modulation", IEEE Transactions on Information Forensics and Security, 10(10): 2212-2224, Published Online Jul. 1, 2015.

(Continued)

*Primary Examiner* — Junpeng Chen

(57) ABSTRACT

An apparatus for jamming transmissions on a wireless network a signal generator and processor circuitry. The signal generator generates jamming signals. The processor circuitry demodulates a wireless signal received over the wireless network in accordance with an IEEE 802.11 standard and identifies a media access control (MAC) header within the demodulated signal. The MAC header includes a duration and at least one address. Frames are identified for jamming based on an analysis of the at least one address. When a frame for jamming is identified, a time period for jamming the wireless signal is calculated based on the duration and the signal generator is controlled to generate a jamming signal during the calculated time period.

24 Claims, 4 Drawing Sheets

(56) References Cited

OTHER PUBLICATIONS

Grover et al. "Jamming and Anti-Jamming Techniques in Wireless Networks: A Survey", International Journal of Ad Hoc and Ubiquitous Computing, 17(4): 197-215, Dec. 2014.
Office Action dated Aug. 11, 2021 From the Israel Patent Office Re. Application No. 268022 and Its Translation Into English. (7 Pages).

* cited by examiner

JAMMING WI-FI COMMUNICATIONS

RELATED APPLICATIONS

This application claims the benefit of priority of Israel Patent Application No. 268022 filed on Jul. 11, 2019, the contents of which are incorporated herein by reference in their entirety.

This application is also related to co-filed, co-pending and co-assigned PCT Patent Application entitled "JAMMING WI-FI COMMUNICATIONS", The contents of the above applications are all incorporated by reference as if fully set forth herein in their entirety.

FIELD AND BACKGROUND OF THE INVENTION

The present invention, in some embodiments thereof, relates to jamming wireless signals, and, more specifically, but not exclusively, to jamming wireless signals based on the IEEE 802.11 standards.

Wi-Fi is a widely used technology for local area networking of radio wireless devices based on the IEEE 802.11 standards. Most instances of Wi-Fi networks are based on an access point (AP) and a set of one or more stations (STA). As shown in FIG. 1, stations (e.g. STA1 and STA2) communicate directly with the AP and may communicate with other stations by forwarding messages via the AP to another station as the ultimate destination.

Jamming Wi-Fi signals to prevent transmission of information over a Wi-Fi network is required for many different applications. These applications range from homeland security and law enforcement needs to civil usage (e.g. to provide a defensive mechanism to block stations that abuse network bandwidth and resources, carry out cyber-attacks, etc.).

Typical 802.11 station transceivers use a mixed radio frequency (RF) front end for both transmit (TX) and receive (RX), due to constraints such as cost, time, size, etc. This prevents a Code-division multiple access with collision detection (CDMA/CD) approach as the transmit power is an order of magnitude higher than the receive sensitivity, causing any RF transmit operation to block reception for the time of the transmission.

To avoid this difficulty, the most commonly used set of 802.11 standards (a/b/g/n/ac), and as a result most of the commercially available Wi-Fi equipment, employ carrier-sense multiple access with collision avoidance (CSMA/CA), with binary exponential backoff algorithm for different stations and APs to successfully share the same channel. This approach divides the time into slots and optimizes the chances of different stations competing for the carrier to select different slots in case they collide, while minimizing retransmit wait time.

Wi-Fi networks and the 802.11 standards split the target spectrum into channels which are subsets of the target spectrum. For example, the 802.11b/g/n standards split the 2.400-2.485 GHz spectrum into 14 channels, each of which is 22 MHz wide, with some of them overlapping.

Current Wi-Fi jammers create interference that prevents usage of a channel or a group of adjacent channels to jam both targeted stations and/or APs. However this indiscriminate frequency-based approach also jams any additional devices (including different stations of the same AP and other Wi-Fi AP/STA groups altogether) that happen to use the jammed frequency ranges, creating unacceptable interference in many cases.

Additional background art includes:

[1] K. Grover, A. Lim and Q. Yang, "Jamming and anti-jamming techniques in wireless networks: a survey," *Int. J. of Ad Hoc and Ubiquitous Computing*, Vol. 17, Issue 4, pp. 197-215, December 2014.

[2] S. Amuru and R. Buehrer, "Optimal Jamming against Digital Modulation," *IEEE Transactions on Information Forensics and Security*, Vol. 10, Issue: 10, pp. 2212-2224, October 2015.

SUMMARY OF THE INVENTION

It is an object of the present invention to provide an apparatus and method for jamming Wi-Fi signals using the different revisions and versions of the 802.11 standard. The destination and/or source of the Wi-Fi communication may be selectively jammed, without interrupting other devices or networks sharing the same frequency channel or adjacent frequencies in the spectrum.

Communications to and/or from devices that are targeted for jamming (denoted jamming targets) are identified by examining one or more address fields in the header of the media access control (MAC) layer frame. When the address of a jamming target is found in the appropriate address field, a jamming signal is transmitted only for the duration of the current frame. Thus transmissions to and/or from the jamming target are blocked, whereas transmissions in different time slots are not interfered with.

Embodiments of the invention include but are not limited to:

1) Blocking (i.e. jamming) a specific Wi-Fi station from exchanging 802.11 frames with a Wi-Fi Access Point, without disturbing the access point itself and other users of the Wi-Fi network; and 2) Blocking a specific Wi-Fi Access Point from exchanging 802.11 frames with all stations associated with it, without interfering with other access points using the same channel and/or frequency range.

The embodiments describe herein provide the benefits of selectivity and the capability to identify and block the communication exchanges of specific Wi-Fi network participants, without jamming other untargeted devices which use the same frequency ranges as the jamming targets.

The foregoing and other objects are achieved by the features of the independent claims. Further implementation forms are apparent from the dependent claims, the description and the figures.

According to a first aspect of some embodiments of the present invention there is provided and apparatus for jamming transmissions on a wireless network. The apparatus includes a signal generator and processor circuitry. The signal generator is configured to generate jamming signals. The processor circuitry is configured to:

demodulate a wireless signal received over the wireless network in accordance with an IEEE 802.11 standard;

identify a media access control (MAC) header within the demodulated signal, the MAC header including a duration and at least one address;

identify frames for jamming based on an analysis of the at least one address; and when a frame for jamming is identified, calculate a time period for jamming the wireless signal based on the duration and control the signal generator to generate a jamming signal during the calculated time period.

With reference to the first aspect of the invention, in a possible implementation the processor circuitry identifies the frame for jamming based on a receiver address in the MAC header.

With reference to the first aspect of the invention, in a possible implementation the processor circuitry identifies the frame for jamming based on a combination of addresses in the MAC header.

With reference to the first aspect of the invention, in a possible implementation the maximum length of the time period is the duration minus a time elapsed since reception of a first bit of the frame for jamming.

With reference to the first aspect of the invention, in a possible implementation the processor circuitry is further configured to tune a receiver to monitor wireless transmissions in at least one channel of the IEEE 802.11 standard.

With reference to the first aspect of the invention, in a possible implementation the receiver of the MAC header is a station.

With reference to the first aspect of the invention, in a possible implementation the receiver of the MAC header is an access point.

With reference to the first aspect of the invention, in a possible implementation the processor circuitry is further configured to discover a communication channel of the access point by decoding and analyzing information transmitted on multiple communication channels in accordance with the IEEE 802.11 standard.

With reference to the first aspect of the invention, in a possible implementation the processor circuitry is further configured to identify modulation parameters of the wireless signal and to select parameters of the jamming signal based on the modulation parameters.

With reference to the first aspect of the invention, in a possible implementation the apparatus further includes at least one wireless receiver, configured to receive the wireless signal transmitted over the wireless network and to provide the received wireless signal to the processor circuitry.

With reference to the first aspect of the invention, in a possible implementation the apparatus further includes at least one wireless transmitter configured to transmit the jamming signal.

With reference to the first aspect of the invention, in a possible implementation the apparatus further includes an adaptive beamforming antenna array, wherein the processor circuitry is configured to control the antenna array to transmit the jamming signal in a specified direction.

With reference to the first aspect of the invention, in a possible implementation the apparatus further includes multiple antennas configured for receiving the wireless, and the processor circuitry is further configured to determine the direction of a source of the received wireless signal by analyzing respective signal strengths of the wireless transmission received at the antennas.

According to a second aspect of some embodiments of the present invention there is provided a method for jamming transmissions on a wireless network. The method includes:

demodulating a received wireless signal in accordance with an IEEE 802.11 standard;

detecting a media access control (MAC) header within the demodulated signal, the MAC header including a duration and at least one address;

identifying frames for jamming based on an analysis of the at least one address; and when a frame for jamming is identified, calculating a time period for jamming the wireless signal based on the duration and generate a jamming signal during the calculated time period.

With reference to the second aspect of the invention, in a possible implementation the method further includes transmitting the jamming signal.

With reference to the second aspect of the invention, in a possible implementation the maximum length of the time period is the duration minus a time elapsed since reception of a first bit of the frame for jamming.

With reference to the second aspect of the invention, in a possible implementation the method further includes identifying the frame for jamming based a receiver address in the MAC header and/or a combination of addresses in the MAC header.

With reference to the second aspect of the invention, in a possible implementation the receiver of the MAC header is a station.

With reference to the second aspect of the invention, in a possible implementation the receiver of the MAC header is an access point.

With reference to the second aspect of the invention, in a possible implementation the method further includes discovering a communication channel of the access point by decoding and analyzing information transmitted on multiple communication channels in accordance with the IEEE 802.11 standard.

With reference to the second aspect of the invention, in a possible implementation the method further includes identifying modulation parameters of the wireless signal and selecting parameters of the jamming signal based on the modulation parameters.

With reference to the second aspect of the invention, in a possible implementation the method further includes controlling an adaptive beamforming antenna array to transmit the jamming signal in a specified direction.

With reference to the second aspect of the invention, in a possible implementation the wireless transmission is received on multiple antennas, and the method further includes determining a direction of a source of the received wireless signal by analyzing respective signal strengths of the wireless transmission received at the antennas.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
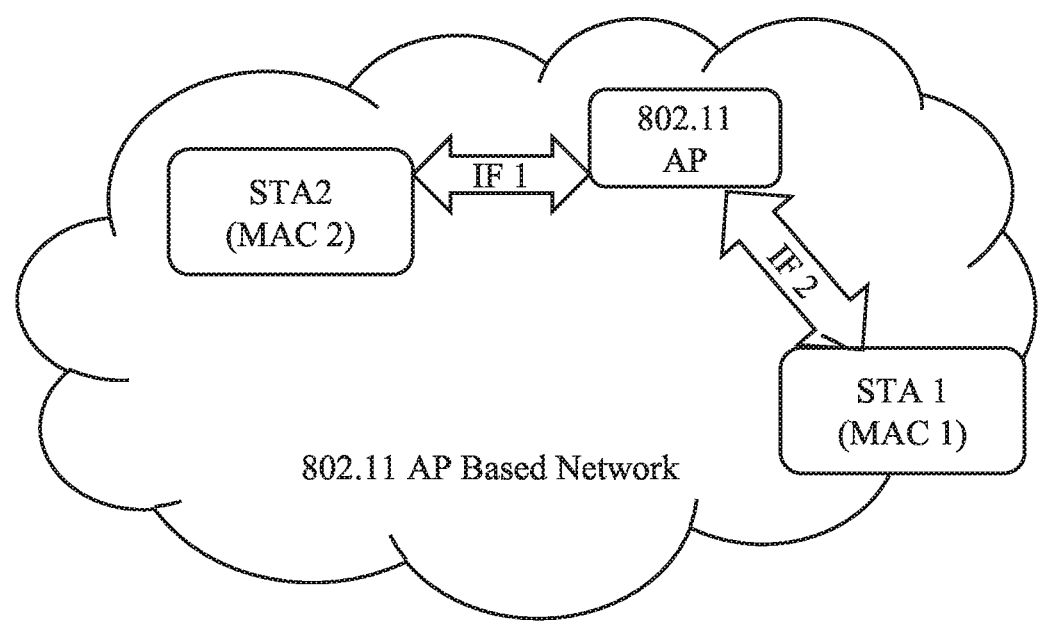
FIG. 1 illustrates the structure of a Wi-Fi network.

The present invention, in some embodiments thereof, relates to jamming wireless signals, and, more specifically, but not exclusively, to jamming wireless signals based on the IEEE 802.11 standards.

Wi-Fi communication exchanges between access points and stations are arranged in frames whose structure is defined by the 802.11 standard(s) employed by the network. Each frame has a preamble which is used to time and synchronize the modulation/demodulation of the physical layer (PHY) and may also contain some meta-data. Following the frame's preamble there is an 802.11 MAC layer frame that includes a MAC header.

The MAC layer frame structure is similar across different 802.11 standards. Each frame consists of a MAC header, payload and frame check sequence (FCS). The first two bytes of the MAC header are a frame control field, which specifies parameters such as version, subtype, retry bit, etc. The following two bytes are a duration ID field, which provides information about the duration of the current frame. Following the duration ID field are four address fields, carrying a MAC address identifying the receiver of the transmission (denoted the receive address) and possibly MAC addresses for one or more of: the transmitter address, the source address, the destination address and the Basic Service Set Identifier (BSSID).

Embodiments of the invention use information found in the MAC header in order to identify the duration of the transmission of the current frame, and to determine whether one or more address fields in the MAC header contain a MAC address or combination of MAC addresses indicating that the current frame should be jammed. If the address or combination of addresses found in the MAC header indicate that the transmission should be jammed, a jamming signal is transmitted only during the time window of the current frame. Otherwise, no jamming signal is transmitted and the current frame is not interfered with. The decision whether to jam Wi-Fi transmissions is made on a frame by frame basis.

When an access point transmits directly to a station, the address of the station in the first address field may also be the destination of the transmission (in which case it is the same as the destination address, if present in the MAC header). Similarly, when a base station transmits directly to an access point, the receiver address may be the same as the destination address (as opposed to cases in the access point forwards the transmission to another access point or station).

When the jamming signal is transmitted at high power, the targeted device will be unable to collect or demodulate the data frame destined to it. When this process is repeated for further attempts to transmit information to the target device it will render target device's network connection unusable and prevent it from effectively exchanging information as part of the Wi-Fi network.

As used herein the terms "frame" and "MAC frame" mean a frame at the MAC sublayer of the 802.11 standard.

As used herein the term "MAC header" means the portion of the frame containing the duration, address fields and other information required by the 802.11 standard.

As used herein the terms "address" and "MAC address" mean an identifier of a device communicating over the Wi-Fi network, in any format compatible with the 802.11 standard. A MAC header carries up to four addresses in respective address fields.

As used herein the term "current frame" means the frame containing the MAC header from which the duration and addresses were obtained.

As used herein the terms "Wi-Fi network" and "Wi-Fi signal" refer respectively to a wireless network and a wireless signal compatible with an IEEE 802.11 standard.

As used herein the terms "802.11" and "802.11 standard" include all current and future standards which are members of the 802.11 family. Current 802.11 standards include but are not limited to:

a) 802.11-1997;
b) 802.11b;
c) 802.11a;
d) 802.11g;
e) 802.11n; and
f) 802.11ac.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Wi-Fi Jamming Apparatus

Figure 2:
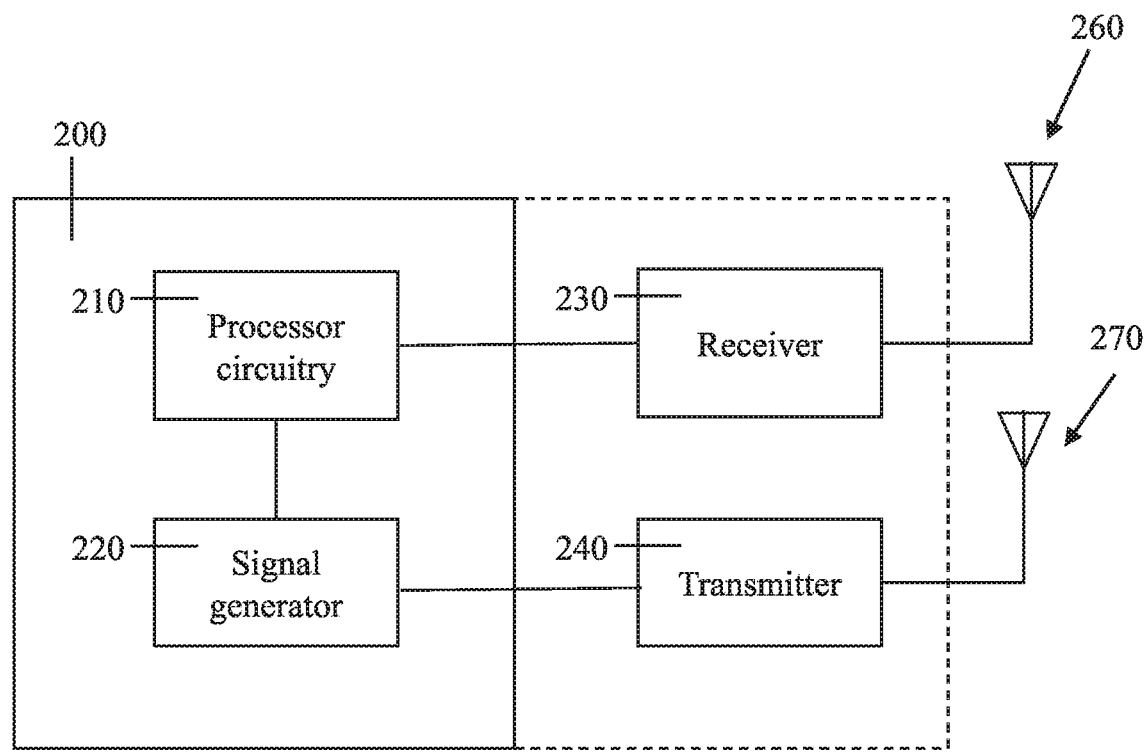
FIG. 2 is a simplified block diagram of an apparatus for jamming transmissions on a wireless network, according to embodiments of the invention.

Reference is now made to FIG. 2, which is a simplified block diagram of an apparatus for jamming transmissions on a wireless network, according to embodiments of the invention. Wi-Fi jammer 200 is capable of jamming Wi-Fi communications both to targeted stations and to targeted access points.

Wi-Fi jammer 200 includes processor circuitry 210 and signal generator 220.

Processor circuitry 210 demodulates a signal received over the wireless network in accordance with an IEEE 802.11 standard. The demodulation is based on the physical implementation of the standard in use. The Wi-Fi signal is obtained from a wireless receiver, which processes the wireless signal prior to demodulation if necessary. Optionally, the receiver may be internal or external to Wi-Fi jammer 200.

The demodulated signal is monitored by processor circuitry 210 to identify media access control (MAC) header. Each MAC header includes a duration, a receiver address and optionally other addresses, as defined by the 802.11 standard.

Processor circuitry 210 identifies determines if an address or combination of addresses in the MAC header indicate that the current frame should be jammed.

Optionally, a frame is jammed only if a target address appears in a specified address field. For example, if the target address is the receiver address, only frames in which the target address is in the first address field are jammed. Thus frames sent to the target address are jammed but frames sent from the target address are not jammed. In a second example, an address may be targeted both if it is a receiver address or a transmitter address. Both address field 1 and address field 2 are checked and if the target address appears in either of the fields the communication is jammed. Thus Wi-Fi communications both to and from the target address are jammed.

Alternately or additionally, a frame is jammed only if the MAC header contains a combination of target addresses in specific address fields. For example, transmissions from a specific transmitter address to a specified receiver address may be jammed without jamming frames sent by other transmitters to the same receiver address.

As used herein, the term "target address" means the network address of a device or network element which is a jamming target.

The amount of data in the MAC header that should be examined in order to identify whether the frame should be jammed depends on the types of addresses which are needed in order to identify if the current frame should be jammed. For example, if only the receiver address is of interest (i.e. transmissions to a particular device or element), monitoring may be stopped once the address field 1 has been decoded. If both the receiver address and the transmitter address are of interest, both address fields 1 and 2 must be decoded before a decision may be made whether the Wi-Fi frame should be jammed.

Optionally, identifying a jamming target is also based on an analysis of the "To DS" and "From DS" fields in the MAC header, in order to determine the type of addresses found in address fields 3 and 4.

Optionally, determining whether a network address found in the MAC header is a target address is performed by checking whether the address is present in a list of target addresses. Optionally, the list specifies the MAC address field(s) in which the network address is considered a target address and/or combinations of addresses in respective specified address fields which indicate that the frame should be jammed.

The list of target addresses may be input or configured in any way known in the art, for example by entry via a user interface (UI), storage in an internal and/or external memory, and so forth.

If the current frame should be jammed, the time period for jamming the wireless signal is calculated from the duration field. Optionally, the maximum length of the time period is the duration minus the time elapsed since the first bit of the frame was received. Thus jamming signal transmission ends before the next frame is sent, so that the jamming signal generated for the current frame does not interfere with subsequent frames.

Optionally, Wi-Fi jammer 200 synchronizes demodulation using the preamble, based on the 802.11 standard in use. After synchronization, Wi-Fi jammer 200 may begin logging bits until the necessary amount of data to determine whether the Wi-Fi frame should be jammed has been collected.

Signal generator 220 generates jamming signals. Processor circuitry 210 controls signal generator 220 to generate jamming signals for transmission during the calculated time period.

Optionally, signal generator 220 generates one or more of:
a) A random frequency hop signal;
b) A noise signal;
c) A sine wave signal;
d) A sequential frequency scan; and
e) A signal having emission patterns emulating a modulation of the wireless signal (for example a QPSK or QAM modulated signal bearing random chips).

Optionally processor circuitry 210 selects jamming signal parameters in order to obtain a desired jamming signal for the current frame. The efficacy of a given jamming signal pattern may be determined empirically via testing and/or simulation under different jamming scenarios.

Optionally, processor circuitry 210 identifies physical (PHY) layer modulation parameters of the wireless signal. The identified modulation parameters are used to select jamming signal parameters and/or modulation parameters. This enables tailoring the jamming signal to have optimal jamming power and effectiveness (i.e. most chances to produce receiver modulation errors) for the specific Wi-Fi signal being jammed. For example, the optimal modulation scheme for jamming an 802.11g/a with BPSK modulation is a BPSK signal modulated with a burst of random bits. In another example, the optimal modulation scheme for an 802.11a/g/n/ac Wi-Fi signal with QPSK or OFDM modulation (e.g. 16-QAM/64-QAM/256-QAM) is a QPSK jamming signal [2].

Optionally, processor circuitry 210 selects parameters of the jamming signal based on at least one of:
a) The distance between Wi-Fi jammer 200 and the transmitting device transmitting the wireless signal;
b) The distance between the transmitting device and a destination device specified by the destination address;
c) The transmission channel of the wireless signal;
d) The modulation of the wireless signal;
e) Channel conditions (e.g. congestion); and
f) Background noise levels and/or patterns;
g) Feedback from previous jamming attempts under similar channel/radio conditions, such as weather jamming resulting in frame retransmits.

Optionally, the PHY layer modulation is identified by passive listening to the target channel and decoding a sample preamble of the communication stream after the modulation has been negotiated between the AP and station.

Jamming a Station

In order to block Wi-Fi transmissions to a targeted station, Wi-Fi jammer 200 jams communications from one or more access points transmitting to the targeted station. When the targeted station's address is detected in address field 1, a jamming signal is generated as described above and transmitted for the time period calculated from the information in the duration field.

Alternately or additionally, Wi-Fi jammer 200 jams frames transmitted by the targeted to one or more access points. When the station's address is found in address field 2, the frame is jammed.

Optionally, processor circuitry 200 tunes a receiver to monitor wireless transmissions of some or all of the access points communicating with the targeted station. Wi-Fi jammer 200 may be provided with access point identifiers (e.g. BSSID, SSID, channel) for the targeted station's network.

Optionally, when the communication channel of the targeted station is unknown, processor circuitry 210 discovers the communication channel by decoding and analyzing information transmitted on the Wi-Fi channels in accordance with the IEEE 802.11 standard and the IEEE 802.11 physical layer implementations. For example, the channel may be discovered by passive scanning of the Wi-Fi transmissions and/or by querying an access point transmitting frames to the targeted station.

An exemplary embodiment of jamming a targeted station is described below.

Jamming an Access Point

In order to block Wi-Fi transmissions from an access point, Wi-Fi jammer 200 jams frames transmitted by one or more stations to the targeted access point. When the access point's address is detected in address field 1, a jamming signal is generated as described above and transmitted for the time period calculated from the information in the duration field.

Alternately or additionally, Wi-Fi jammer 200 jams frames transmitted by the access point. When the access point's address is found in address field 2, the frame is jammed.

Optionally, processor circuitry 200 tunes a receiver to monitor wireless transmissions to and from the access point.

An exemplary embodiment of jamming an access point is described below.

Wireless Communication

Optionally, Wi-Fi jammer 200 further includes at least one wireless receiver 230 and/or at least one wireless transmitter 240. Further optionally the receiver(s) and transmitter(s) are integrated into a single RF device (e.g. a transmitter-receiver or transceiver).

Receiver

Receiver 230 receives the wireless signal transmitted over the wireless network and provides the received wireless signal to the processor circuitry.

Receiver 230 may have a single reception channel or multiple parallel reception channels that can receive over different 802.11 frequency channels. Alternately or additionally, receiver 230 is tunable to different multiple frequency ranges (channels) of the 802.11 signals.

Optionally, receiver 230 includes one or more of:
1) Low noise amplifier (LNA);
2) Noise reduction circuitry or instructions for running noise reduction algorithms;
3) Digital and/or analog signal processing (e.g. for signal enhancement);
4) At least one analog filter (e.g. for reducing background noise and inter-channel interference); and
5) RF elements such as repeaters, splitters, switches, etc.

Transmitter

Transmitter 240 transmits the jamming signal. Optionally, transmitter 240 includes up-conversion and/or modulation circuitry which convert the jamming signal generated by signal generator 220 into a signal suitable for transmission on a Wi-Fi channel.

Optionally, transmitter 240 has multiple transmission paths and is capable of transmitting multiple jamming signals over multiple Wi-Fi channels simultaneously.

Optionally, transmitter 240 includes one or more of:
1) Power amplifier (PA);
2) Digital and/or analog signal processing;
4) RF elements such as filters repeaters, splitters, joiners, multiplexers, converters etc.

Antenna(s)

The Wi-Fi and jamming signals are received and/or transmitted using one or more antennas.

Optionally, Wi-Fi jammer 200 includes one or more receive antennas 260 for receiving Wi-Fi signals and/or one or more transmit antennas 270 for transmitting the jamming signal. For example, multiple antennas may operate as a phased antenna array. The antenna(s) may be optimized for particular Wi-Fi channel(s).

Optionally, the antenna(s) are integrated into Wi-Fi jammer 200. Alternatively or additionally, Wi-Fi jammer 200 is connected to one or more external antennas.

Optionally, the antennas are multiplexed so that they may both receive and transmit the Wi-Fi signals.

Optionally, Wi-Fi jammer 200 determines the direction of transmitter of the Wi-Fi signal by analyzing respective signal strengths received over multiple antennas or by any other technique known in the art.

Optionally, Wi-Fi jammer 200 transmits the jamming signal though an adaptive beamforming antenna array (e.g. as an array of transmitters 240 connected to a phased antenna array), and processor circuitry controls the antenna array so that the jamming signal is transmitted towards a device (e.g. access point or station) being jammed. For example, processor circuitry 210 increases/decreases the respective amplitudes of multiple phased transmitters in a way that maximizes constructive wave interference in the direction of the source signal and maximizes destructive interference in other directions. In this way, the chances of the targeted device (the jammed AP or station) receiving the jamming signal is maximized, while devices located in different directions receive a lower strength jamming signal.

Additional Components

Optionally, Wi-Fi jammer 200 includes at least one of:

a) Internal and/or external power source—for example a power supply connectable to electric mains (e.g. for fixed installations) and/or a battery (e.g. for portable Wi-Fi jammers);

b) User interface—May include elements such as user interface controls, on/off switches, power gauges and controls (e.g. for reading and controlling the transmit power), keyboards or keypads for direct input, LCD or other output media for system output such as status, errors, etc.;

c) Memory for storing instructions executable by processor circuitry 210 and/or information used by Wi-Fi jammer 200 (e.g. list of targeted MAC addresses); and d) Communication port(s) (e.g. digital communication interface, connections to antennas, etc.).

Method for Jamming a Wi-Fi Signal

Figure 3:
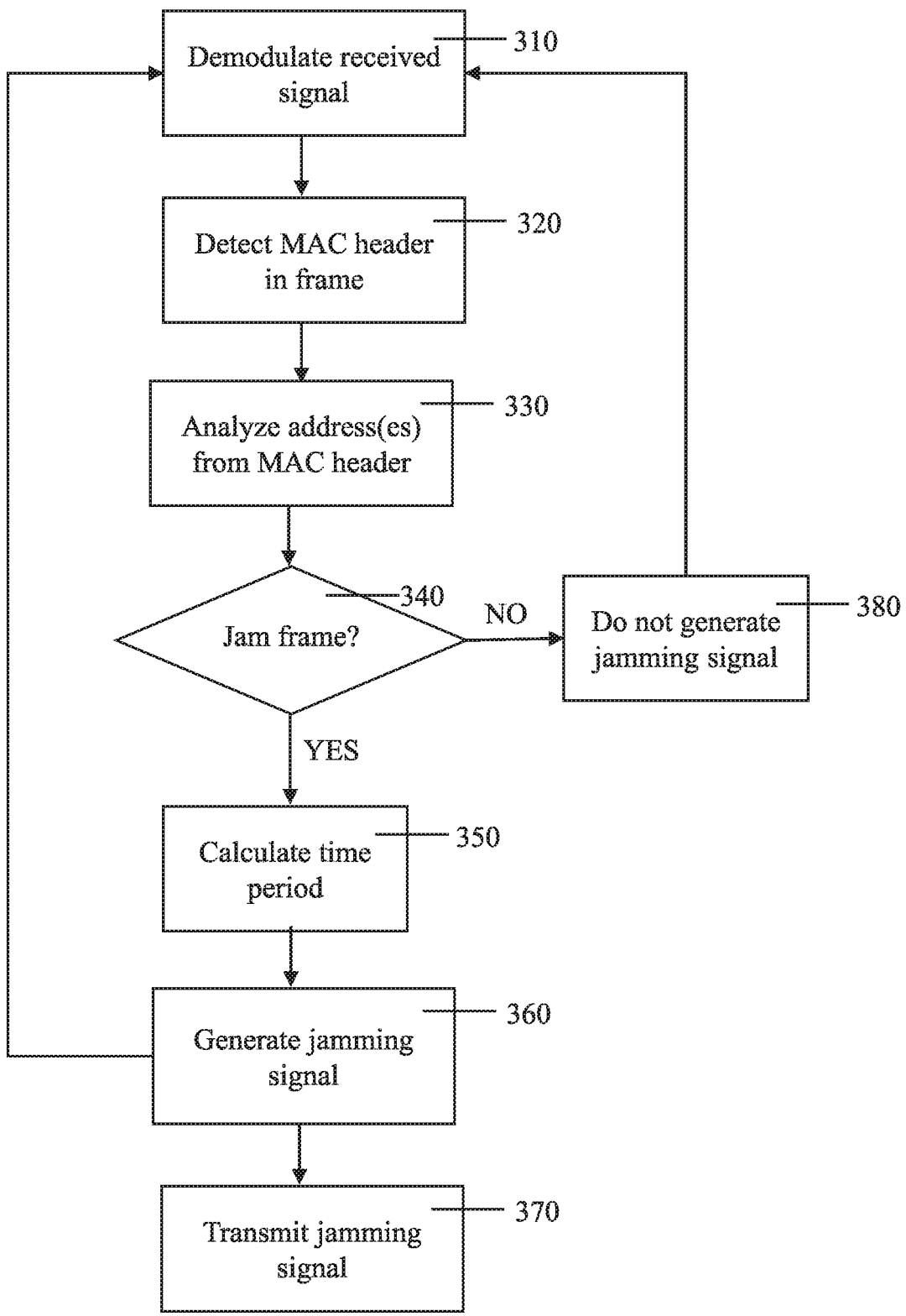
FIG. 3 is a simplified flowchart of a method for jamming transmissions on a wireless network, according to embodiments of the invention.

Reference is now made to FIG. 3, which is a simplified flowchart of a method for jamming transmissions on a wireless network, according to embodiments of the invention.

In 310, a received wireless signal is demodulated in accordance with an IEEE 802.11 standard. In 320 a MAC header is detected in a demodulated frame.

In 330-340, one or more addresses from the MAC header are analyzed as described above in order to identify if the frame should be jammed. The analysis may be performed by any means known in the art, including but limited to rule based analysis and/or look-up in a table listing target addresses or combinations of addresses indicating that the frame should be jammed.

The jamming target may be an access point, a station or a combination of different devices based on an analysis of multiple address fields in the MAC header. Optionally, the type of address in each address field is determined by examining the "To DS" and "From DS" fields in the MAC header.

When a frame for jamming is identified, in 350 a time period for jamming the wireless signal is calculated based on information in the MAC header duration field. Optionally, the maximum length of the time period is the duration minus the time that has elapsed since the first bit of the frame was received.

In 360, a jamming signal is generated for transmission during the calculated time period.

Optionally, in 370 the jamming signal is transmitted during the calculated time period.

If the analysis in 330-340 indicates that the frame should not be jammed, no jamming signal is generated in 380 and demodulation of the Wi-Fi signal continues.

Optionally, the method further includes at least one of:

a) Discovering the access point communication channel by decoding and analyzing information transmitted on multiple communication channels;

b) Identifying modulation parameters of the wireless signal and selecting parameters of the jamming signal based on the identified modulation parameters;

c) Controlling an adaptive beamforming antenna array in order to transmit the jamming signal in a specified direction; and d) Determining the direction of the source of the received wireless signal by analyzing the signal strengths received at multiple antennas.

Exemplary Wi-Fi Jammer

Figure 4:
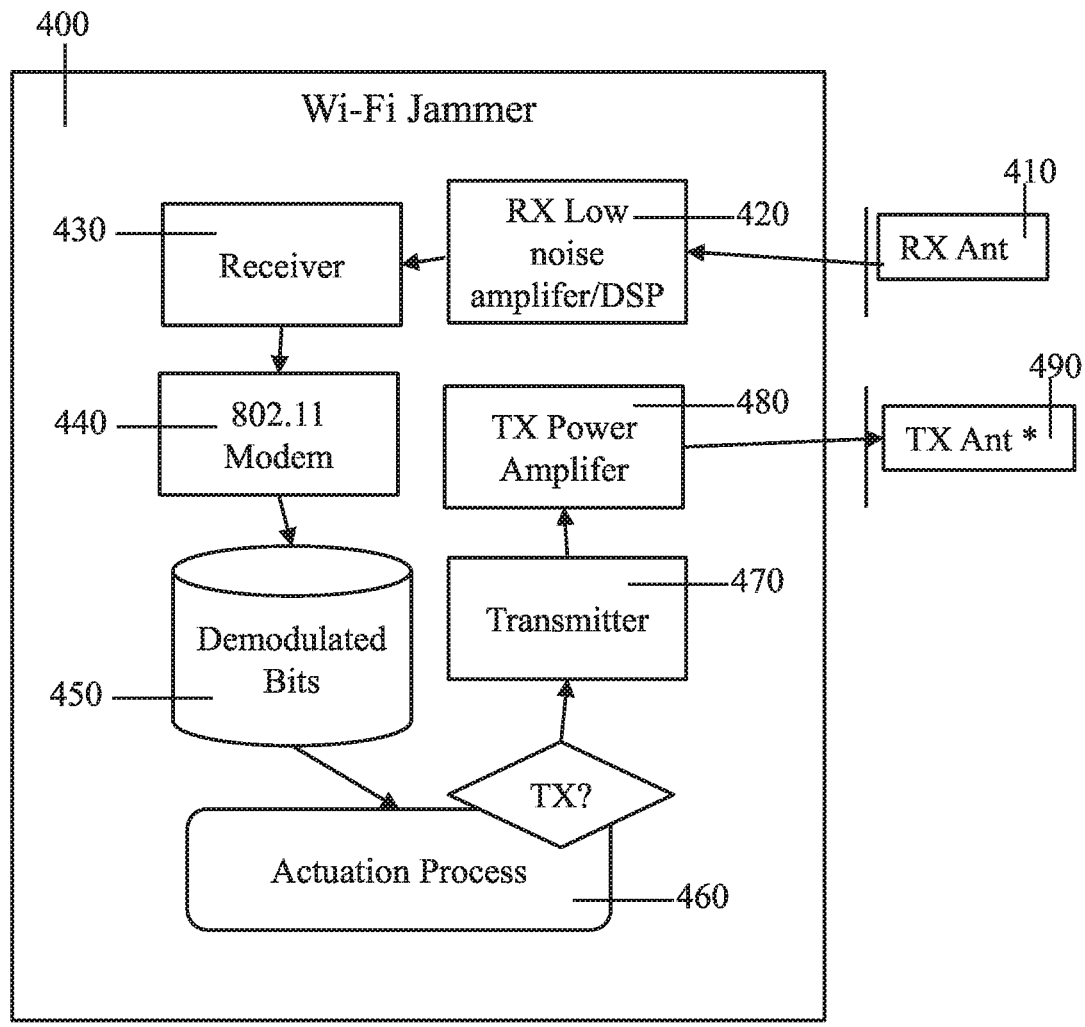
FIG. 4 is a simplified block diagram of a Wi-Fi jammer, according to an exemplary embodiment of the invention.

Reference is now made to FIG. 4 which is a simplified block diagram of a Wi-Fi jammer according to an exemplary embodiment of the invention.

Wi-Fi jammer 400 receives the wireless signal via receive (RX) antenna 410. The received signal is processed by the low noise amplifier/DSP 420 and receiver 430 and provided to Wi-Fi modem 440 for demodulation. The demodulated bits are stored in memory 450 until the necessary number of bits have been collected. An actuation process 460 is applied by processing circuitry to the collected bits in order to determine if an address or combination of addresses in the MAC header indicate that a jamming signal should be transmitted in order to jam the frame. If the actuation process decides that the frame should be jammed, transmitter 470 is controlled to generate and transmit a jamming signal. The jamming signal is amplified by power amplifier 480 and provided to transmit antenna 490.

Station Jamming Mode

In a first exemplary embodiment, Wi-Fi jammer 400 jams a station (or stations) to prevent it from receiving Wi-Fi transmissions.

Wi-Fi jammer 400 receives as input a list of MAC addresses of one or more targeted stations and the access point identifiers of each targeted station's network (e.g. BSSID, SSID, channel, etc.). Wi-Fi jammer 400 tunes RF receive components to the correct channel(s) in order to be able to intercept signals emitted from the access point(s) transmitting to the targeted stations.

Wi-Fi jammer 400 uses 802.11 modem 440 to sense the 802.11 type and modulation (e.g. 802.11/a/b/g/n/ac) by passive scanning and/or querying one or more access points. After identifying the 802.11 technology, Wi-Fi jammer 400 waits to receive identified physical bits from the underlying carrier.

Upon receipt of an 802.11 frame preamble, Wi-Fi jammer 400 synchronizes modem 440 with the preamble based on the selected technology (e.g. training signals etc.). Bits are demodulated in real-time from the PHY medium and logged into a BITBUFFER. Wi-Fi jammer 400 also logs the time of the receipt of first information bit of the frame When at least 80 bits of information have been collected (which contain both the duration and the Address 1 fields as per the 802.11 standards), Wi-Fi jammer 400 compares the MAC address in the Address 1 field with the list of MAC addresses of targeted stations.

If the MAC address in Address 1 is in the list (i.e. is the MAC address of a targeted station), a jamming signal on the 802.11 channel in use by the targeted station is generated and conveyed by transmitter 470 and transmit power amplifier 480 to transmit antenna 490. The jamming signal is transmitted for a time interval set to no longer than the duration of the frame (as given in the MAC header duration field) minus the time elapsed since the first bit of the frame was received. The ensures that the jamming signal only interferes with the target frame, while other users of the access point and/or channel are not affected by the transmission This jamming operation (coupled by a strong enough Power Amplifier 480) prevents the targeted station from collecting and demodulating the data frame destined to it. When this process is repeated for each and every attempt by the access point(s) to transmit information to the station, the station's network connection is rendered unusable and prevented from effectively exchanging information as part of the network.

Optionally, the list of MAC addresses also includes the addresses of targeted access points in order to block the targeted access points from receiving transmissions from stations or other access points. When the MAC address of a targeted access point is found in Address 1 field, a jamming signal is transmitted.

Figure 5:
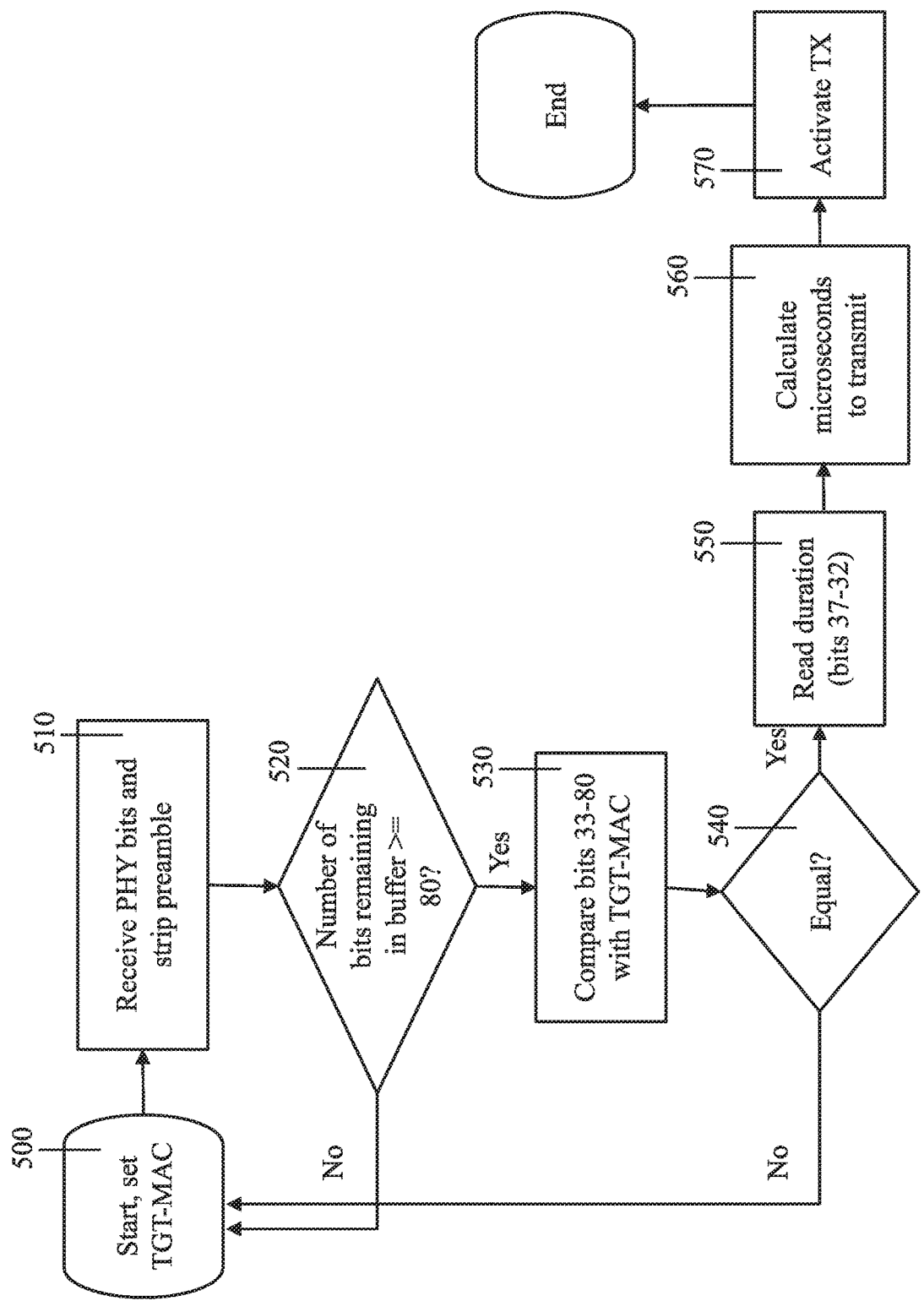
FIG. 5 is a simplified flowchart of a method for jamming targeted Wi-Fi devices, according to an exemplary embodiment of the invention.

Reference is now made to FIG. 5, which is a simplified flowchart of a method for jamming targeted Wi-Fi devices, according to an exemplary embodiment of the invention.

In 500 a list containing one or more MAC addresses of targeted devices (TGT-MAC) is established.

In 510, PHY layer bits of a Wi-Fi transmission are received, and the preamble is stripped based on the type of the 802.11 standard in use (e.g. 802.11b, 802.11a, 802.11g, etc.).

In 520, MAC header bits are buffered. When the number of buffered bits is at least 80, in 530-540 the MAC address in address field 1 (bits 33-80) is compared to the list of targeted MAC addresses (TGT-MAC).

If bits 33-80 are found in the TGT-MAC list, in 550 the duration field (bits 32-37) is read in order to determine the frame duration.

The time interval for jamming signal actuation is calculated in 560. The time interval is calculated as the value of the duration field minus the number of microseconds since processing of the frame began.

In 570, the jamming signal is transmitted for the calculated time interval. The jamming signal prevents the targeted device from receiving Wi-Fi transmissions.

Access Point Jamming Mode

In a second exemplary embodiment, the Wi-Fi jammer jams all frames originating from an access point (or access points). The MAC address of the access point(s) (e.g. BSSIDs) are configured as a list of one or more jamming targets.

In order to block frames transmitted by the access point, enough bits must be demodulated to identify the MAC address in both address field one and address field 2. The determination of whether the frame should be jammed is performed after at least the first 128 bits of the MAC header have been demodulated (as opposed to the first exemplary embodiment in which only 80 bits must be demodulated).

When a frame containing a targeted Access Point's MAC address in its Address 2 field is identified, the jamming signal is transmitted.

Optionally, the access point's channel is automatically discovered (e.g. by passively decoding information on the different Wi-Fi channels, sequentially hopping between them, etc.) and serves as additional input (e.g. for establishing the type of jamming signal to be transmitted).

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant Wi-Fi standards, Wi-Fi modems, signal generators, receivers, transmitters, antennas, digital signal processing techniques, modulations, jamming signals, access points, stations and Wi-Fi devices will be developed and the scope of the terms Wi-Fi standard, Wi-Fi modem, signal generator, receiver, transmitter, antenna, digital signal processing, modulation, jamming signal, access point, station and Wi-Fi device are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated in its/their entirety.

What is claimed is:

1. An apparatus for jamming transmissions on a wireless network, comprising: a signal generator, configured to generate jamming signals; and processor circuitry associated with said signal generator, configured to: demodulate a wireless signal received over said wireless network in accordance with an IEEE 802.11 standard; identify a media access control (MAC) header within said demodulated signal, said MAC header comprising a duration and at least one address; identify frames for jamming based on an analysis of said at least one address by identifying said at least one address as a target address when said at least one address is listed in a list of target addresses of specified devices participating in said wireless network and predetermined as devices targeted for jamming; and when a frame for jamming is identified, calculate a time period for jamming said wireless signal, said calculated time period being no longer then said duration and control said signal generator to generate a jamming signal during said calculated time period to block communication exchange between specific participants of said wireless network by jamming a transmission of a specific device with said generated jamming signal.

2. An apparatus according to claim 1, wherein said processor circuitry identifies said frame for jamming based on a receiver address in said MAC header.

3. An apparatus according to claim 1, wherein said processor circuitry identifies said frame for jamming based on a combination of addresses in said MAC header.

4. An apparatus according to claim 1, wherein a maximum length of said time period is said duration minus a time elapsed since reception of a first bit of said frame for jamming.

5. An apparatus according to claim 1, wherein said processor circuitry is further configured to tune a receiver to monitor wireless transmissions in at least one channel of said IEEE 802.11 standard.

6. An apparatus according to claim 1, wherein a receiver of said MAC header comprises a station.

7. An apparatus according to claim 1, wherein a receiver of said MAC header comprises an access point.

8. An apparatus according to claim 7, wherein said processor circuitry is further configured to discover a communication channel of said access point by decoding and analyzing information transmitted on a plurality of communication channels in accordance with said IEEE 802.11 standard.

9. An apparatus according to claim 1, wherein said processor circuitry is further configured to identify modulation parameters of said wireless signal and to select parameters of said jamming signal based on said modulation parameters.

10. An apparatus according to claim 1, further comprising at least one wireless receiver, configured to receive said wireless signal transmitted over said wireless network and to provide said received wireless signal to said processor circuitry.

11. An apparatus according to claim 1, further comprising at least one wireless transmitter configured to transmit said jamming signal.

12. An apparatus according to claim 1, further comprising an adaptive beamforming antenna array, wherein said processor circuitry is configured to control said antenna array to transmit said jamming signal in a specified direction.

13. An apparatus according to claim 1, comprising a plurality of antennas configured for receiving said wireless signal, said processor circuitry being further configured to determine a direction of a source of said received wireless signal by analyzing respective signal strengths of said wireless transmission received at said antennas.

14. A method for jamming transmissions on a wireless network, comprising: demodulating a received wireless signal in accordance with an IEEE 802.11 standard; detecting a media access control (MAC) header within said demodulated signal, said MAC header comprising a duration and at least one address; identifying frames for jamming based on an analysis of said at least one address by identifying said at least one address as a target address when said at least one address is listed in a list of target addresses of specified devices participating in said wireless network and predetermined as devices targeted for jamming; and when a frame for jamming is identified, calculating a time period for jamming said wireless signal, said calculated time period being no longer then said duration and generate a jamming signal during said calculated time period to block communication exchange between specific participants of said wireless network by jamming a transmission of a specific device with said generated jamming signal.

15. A method according to claim 14, further comprising transmitting said jamming signal.

16. A method according to claim 14, wherein a maximum length of said time period is said duration minus a time elapsed since reception of a first bit of said frame for jamming.

17. A method according to claim 14, further comprising identifying said frame for jamming based on one of a receiver address in said MAC header and a combination of addresses in said MAC header.

18. A method according to claim 14, wherein said receiver of said MAC header comprises a station.

19. A method according to claim 14, wherein said receiver of said MAC header comprises an access point.

20. A method according to claim 19, further comprising discovering a communication channel of said access point by decoding and analyzing information transmitted on a plurality of communication channels in accordance with said IEEE 802.11 standard.

21. A method according to claim 14, further comprising identifying modulation parameters of said wireless signal and selecting parameters of said jamming signal based on said modulation parameters.

22. A method according to claim 14, further comprising controlling an adaptive beamforming antenna array to transmit said jamming signal in a specified direction.

23. A method according to claim 14, wherein said wireless transmission is received on a plurality of antennas, further comprising determining a direction of a source of said received wireless signal by analyzing respective signal strengths of said wireless transmission received at said antennas.

24. The apparatus according to claim 12, wherein said specified direction is a direction of a device being jammed, within said wireless network.

* * * * *